United States Patent
Ferro et al.

(10) Patent No.: US 10,475,017 B2
(45) Date of Patent: Nov. 12, 2019

(54) POINT-OF-SALE METHOD, TERMINAL, AND COMPUTER-READABLE MEDIUM

(71) Applicant: Mobivity, Inc., Chandler, AZ (US)

(72) Inventors: Jay Ferro, Goleta, CA (US); Tariq Mufti, Ojai, CA (US)

(73) Assignee: Mobivity, Inc., Chandler, AZ (US)

( * ) Notice: Subject to any disclaimer, the term of this patent is extended or adjusted under 35 U.S.C. 154(b) by 0 days.

(21) Appl. No.: 15/350,026

(22) Filed: Nov. 12, 2016

(65) Prior Publication Data

US 2017/0061418 A1  Mar. 2, 2017

Related U.S. Application Data

(63) Continuation of application No. 12/697,999, filed on Feb. 1, 2010, now abandoned, which is a continuation-in-part of application No. 11/690,894, filed on Mar. 26, 2007, now abandoned.

(60) Provisional application No. 60/767,407, filed on Mar. 26, 2006.

(51) Int. Cl.
| | | |
|---|---|---|
| G06Q 30/00 | (2012.01) | |
| G06Q 20/20 | (2012.01) | |
| G06F 16/9535 | (2019.01) | |
| G06Q 30/02 | (2012.01) | |
| G06Q 50/12 | (2012.01) | |

(52) U.S. Cl.
CPC ....... *G06Q 20/209* (2013.01); *G06F 16/9535* (2019.01); *G06Q 20/204* (2013.01); *G06Q 30/0226* (2013.01); *G06Q 30/0268* (2013.01); *G06Q 30/0277* (2013.01); *G06Q 50/12* (2013.01)

(58) Field of Classification Search
CPC ...................................................... G06Q 30/02
USPC .......................................... 705/14.53, 14.49
See application file for complete search history.

*Primary Examiner* — Sun M Li
(74) *Attorney, Agent, or Firm* — Clause Eight IPS; Michael Catania

(57) ABSTRACT

There is disclosed a method, a point-of-sale terminal, and a computer-readable storage medium. The point-of-sale terminal may generate transaction information for a commercial transaction, the transaction information including customer information and purchase information. The point-of-sale terminal may generate nutritional information based on the purchase information. The point-of-sale terminal may send the customer information, the purchase information, and location information identifying a location of the POS terminal to an advertising server, and may receive responsive advertising content from the advertising server. The point-of-sale terminal may print a receipt including the transaction information, the nutritional information, and the advertising content.

7 Claims, 2 Drawing Sheets

POINT-OF-SALE METHOD, TERMINAL, AND COMPUTER-READABLE MEDIUM

CROSS REFERENCE TO RELATED APPLICATION

The Present Application is a continuation application of U.S. patent application Ser. No. 12/697,999, filed on Feb. 1, 2010, which is a continuation application of U.S. patent application Ser. No. 11/690,894, filed on Mar. 26, 2007, now abandoned, which claims benefit under 35 USC 119(e) of U.S. Provisional Patent Application No. 60/767,407, filed on Mar. 26, 2006, all of which are hereby incorporated by reference in their entireties.

STATEMENT REGARDING FEDERALLY SPONSORED RESEARCH OR DEVELOPMENT

Not Applicable

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND OF THE INVENTION

Field of the Invention

This disclosure relates generally to Point-Of-Sale (POS) systems, and more particularly to real-time advertisement generation with POS Systems.

Description of the Related Art

There are many instances of retail POS systems that generate some type of token, coupon, or advertisement, particularly in the food supermarket context. Various systems exist in this context to provide history-driven discounting, and purchase-driven discounting. In the history-driven systems, a customer "registers" with the system and then a customer profile is created. Each time the customer identifies themselves with the system, such as by using a shopping card having their registration information, the profile is processed using a range of possible algorithms including comparing current purchases to past purchases by quantity, brand, and, product and generates general or specific coupons or tokens.

In a purchase-driven system, a user is not required to register as the system processes the specific group of products and generates appropriate coupons and tokens consistent with the then current advertising algorithm. Still other systems may combine aspects of these different modalities, such as to use a customer card to realize a special pricing on a particular brand of product. A key focus of these systems is that the discount is for a product or service offered by the food supermarket—that is these systems promote the supermarket's own inventory.

There are many other establishments where a POS system is used that could benefit from a properly implemented advertising program tied into its receipt system. These establishments include restaurants (e.g., "fast food" and traditional dining businesses and the like), entertainment facilities (e.g., theme parks, sporting events, theatre/movies, and the like), and retail stores and outlets of all descriptions. In many of these cases, the history-driven discounting model and the purchase-driven discounting model are inapplicable or not particularly compelling to warrant installation and management.

There is believed to be a tremendous opportunity being missed by these establishments in generating customer-value and enhancing revenue by implementing a different advertising model in these situations. In all of them, a receipt is being generated that heretofore is generally viewed as worthless to the purchaser.

What is needed is a system, method, and computer program product to transform receipts from these establishments into valuable indicia that provides value to both the customer and to the establishment.

BRIEF SUMMARY OF THE INVENTION

Disclosed is an apparatus, method, system, and computer-program product for producing valuable POS indicia that provides value to both the customer and to the establishment. The apparatus includes a Point-Of-Sale (POS) system for generating a receipt of a commercial transaction at a location of the commercial transaction; a POS receipt module, coupled to the POS system, for signaling to a process that the receipt is to be printed, the module submitting a set of POS data to the process to request a responsive advertising content from the process wherein the set of POS data includes a geographic identifier component of the location; an advertising system for supporting the process, the advertising system responsive to the set of POS data, to provide the responsive advertising content to the POS-resident receipt module wherein the responsive advertising content includes a time and location sensitive individualized advertising message responsive to the geographic identifier component and to a time-of-day of the commercial transaction; wherein the POS-resident receipt module incorporates the responsive advertising content into the receipt provided to a customer associated with the commercial transaction.

The method includes processes for the manufacture, assembly and use of the disclosed system, with the computer program product including machine-executable instructions for carrying out the disclosed methods.

Real-time localized (e.g., time, geography and the like) POS indicia are realized that enhance both consumer and merchant value. The disclosed materials enable simple, efficient, and economical transformation of receipts from these establishments into valuable indicia that provide value to both the customer and to the establishment.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

The Nutricate AdServer (NAdS) is designed to download advertisements for incorporation into receipts produced on a restaurant's Point-of-Sale system. The incorporated patent application describes several examples of exemplary POS indicia incorporated into a POS real-time localized receipt. (Other variations are contemplated and are within the scope of the present invention—the invention is not limited to these examples).

Scenario: A foodservice establishment contracts with an advertiser to publish on their customer receipts commercial messages personalized for each customer. The contract might stipulate differing messages for each type of customer as identified by the location of the particular restaurant, the time the meal was purchased and the menu items purchased. The contract may place limits, upper or lower, on impressions in given regions, or at particular restaurants within regions. The contract might stipulate the number of impressions that each category of message can generate. There may be further stipulations of updating the messages and associated graphics with a particular periodicity. And lastly, there may be provisions for periodic updating of all above parameters and syntax.

Management: This contract is parameterized, and stored in the NAdS's Contract database. This may be one of several contracts registered with the NAdS, each uniquely identified, and managed and executed alongside others. Contracts between more than one chain and more than one advertiser may coexist on the same server.

Invocation: As a customer finishes ordering his meal, the counter clerk keys the POS system for a receipt, generating a query to the Nutricate AdServer. The POS identifies itself with a unique identifier; the NAdS queries the POS for location, time-of-service and Purchase Details. For security purposes, an encoded dialog may take place between the two systems before the NAdS accepts the transaction from the POS.

On authentication, the NAdS searches out the appropriate contract, determines the nature and status of the transaction to be executed, and processes the contract parameters with the POS data. The Content Server then generates the appropriate content, and the NAdS transmits the content to the POS for printing along with the receipt. Registers and servers accumulate data on executed transactions for accounting and billing purposes.

Caching & Security: To optimize latency in printing whilst ensuring security, it may be desirable in some cases to cache some information, parameters and content on the POS itself, and to replenish and update it only periodically. This would reduce the number of transactions between the POS and NAdS, and may require specific modifications to be made to the POS software.

Figure 1:
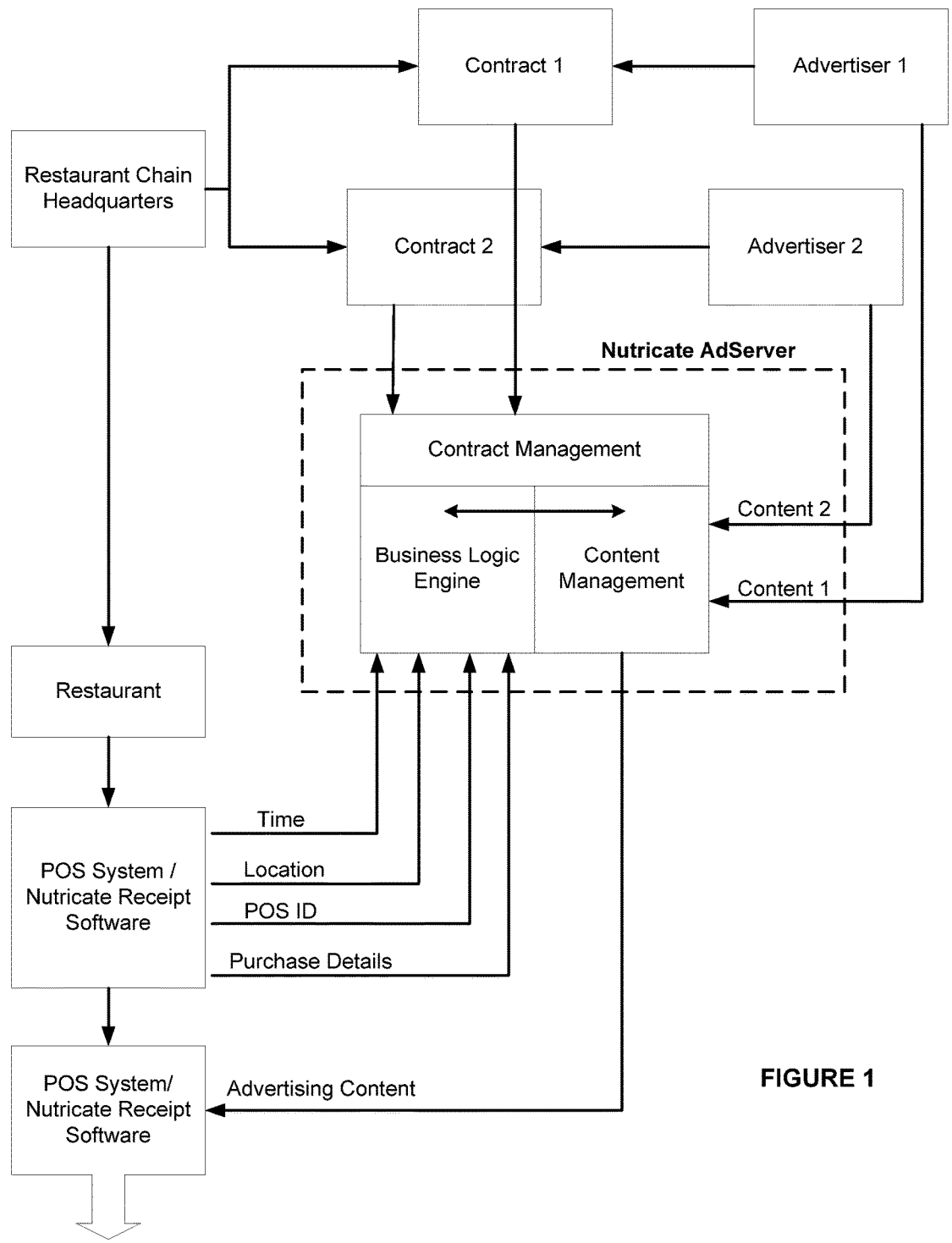
FIG. 1 is a high-level depiction of functionality layout.
Figure 2:
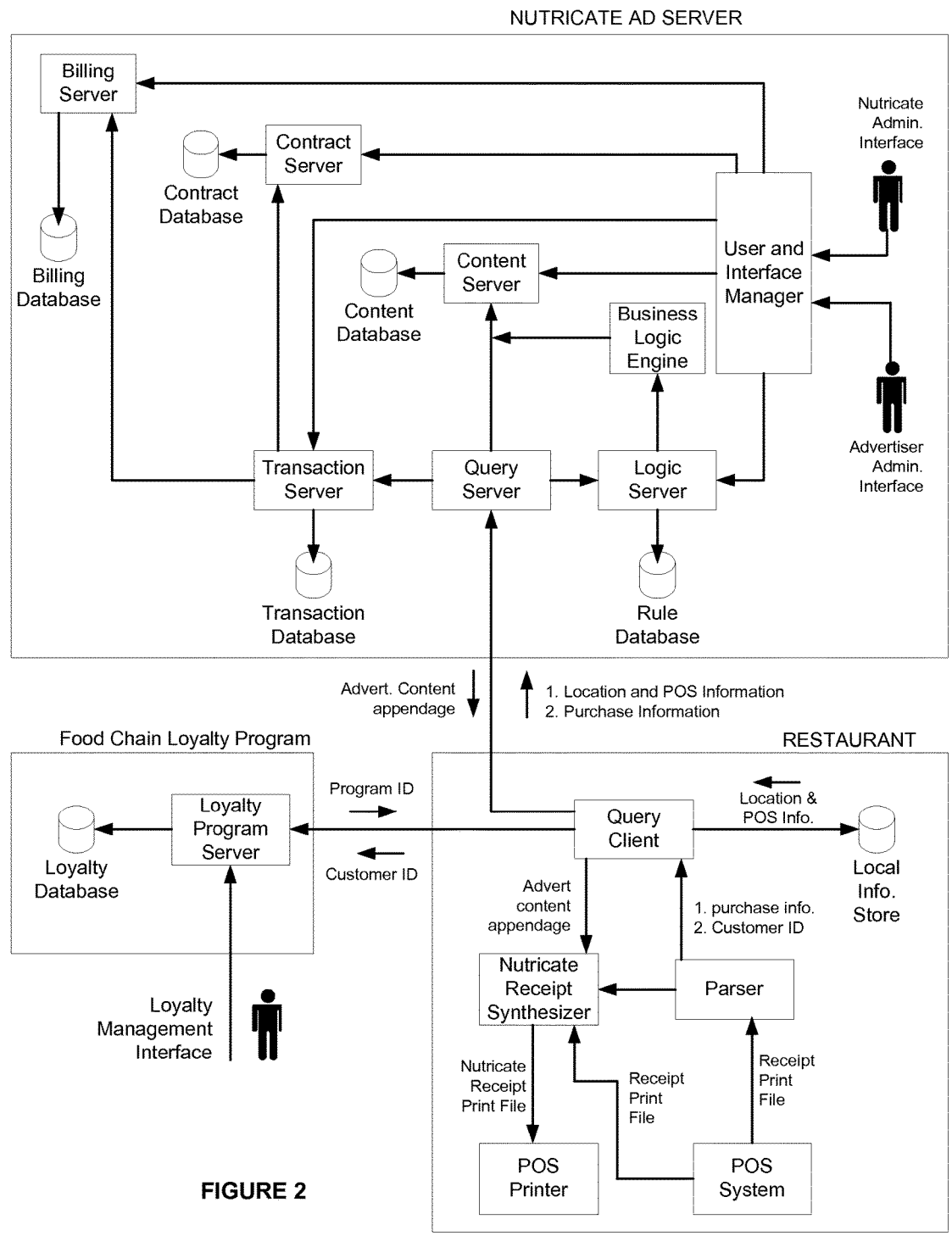
FIG. 2 is a schematic block diagram of a representative system including an architecture and a provision for a loyalty program feature.

FIG. 1 is a high-level depiction of functionality layout. FIG. 2 is a schematic block diagram of a representative system including an architecture and a provision for a loyalty program feature.

Sequenced Operation within the Nutricate AdServer

Note that the Query Server (QS) acts as an executive of the system thus invoking various services in turn. The following is a representative, non-exhaustive example of an operational sequence:

(1) QS is invoked by the Query Client (QC) with information (Transaction Information) including Location and POS information, Purchase information, and Customer information;

(2) QS calls Transaction Server (TS) for authorization, providing Transaction Information at (1);

(3) TS calls Contract Server to determine contract information (cotan) including contract type and contract limits;

(4) TS invokes Billing Server (BS) to obtain authorization. When authorization is obtained, TS returns cotan to QS;

(5) QS calls Business Logic Engine (BLE) with cotan and Transaction Information at (1);

(6) BLE determines and passes Content Selection Criteria (cosec) to QS;

(7) QS calls Content Server (CS) with cosec and cotan; CS returns advertisement content to QS; and (8) To complete the call from QC, QS does the following:
a. Calls TS to commit the transaction; TS in turns calls BS to report the transaction; and b. Returns advertisement content to QC.

Sequenced Operation at the Client End

Operations described here are triggered at the client-end when a print file is generated by the POS System and sent to the POS Printer. If the Nutricate option is not selected, the print file is simply printed by the POS Printer. Otherwise, the following sequence of operations is followed: [0037] (1) The Parser parses the print file to retrieve the following information for passing to the Query Client (QC): Customer ID and Purchase information; [0038] (2) Parser passes Purchase Information to Nutricate Receipt Synthesizer (NRS); [0039] (3) NRS generates Nutritional Information to append to receipt (or other consumer interest enhancement information which may be directly integrated into the receipt or more loosely appended to the receipt through other association systems, such as for example a secondary printer); [0040] (4) QC calls the Loyalty Program Server with Customer ID to obtain any customer information available; (5) QC obtains location and POS information from the Local Information Store; [0042] (6) For getting advertisement content, QC calls QS with following information: Location and POS information, Purchase information, and customer information; [0043] (7) The QC passes the advertisement content NRS. [0044] (8) NRS recreates the Receipt by placing nutritional information, advertisement content and POS receipt in appropriate sequence. [0045] (9) NRS sends the Receipt to the POS printer.

As described herein, commercial establishment includes commercial entities individually or collectively, and any or all of such establishments could be networked together and linked by cross-selling relationships, with receipts from each establishment carry advertising messages relating to customer opportunities at other linked establishments.

As described above, consumer interest enhancement information may include other types of information different from or in addition to nutritional information (as appropriate for the commercial entity and consumer pool). The embodiments of the present invention include options to directly or loosely couple one or more of the consumer interest enhancement information and/or the advertising content onto the receipt. These optional couplings include different modes of associating the content to the receipt such as direct integration into the receipt, production of an ancilliary receipt or generation of a token or other mechanism to retrieve the information through some other communication channel (e.g., download from a computer system or kiosk adapted for this purpose).

The additional information (consumer interest enhancement information and/or the advertising content) is preferably transaction sensitive information responsive to a transaction attribute (e.g., time and/or geographic location and/or other characteristic(s) of the transaction including data regarding the consumer and/or commercial entity and the commercial transaction).

The system, method, computer program product, and propagated signal described in this application may, of course, be embodied in hardware; e.g., within or coupled to a Central Processing Unit ("CPU"), microprocessor, microcontroller, System on Chip ("SOC"), or any other programmable device. Additionally, the system, method, computer program product, and propagated signal may be embodied in software (e.g., computer readable code, program code, instructions and/or data disposed in any form, such as source, object or machine language) disposed, for example, in a computer usable (e.g., readable) medium configured to store the software. Such software enables the function, fabrication, modeling, simulation, description and/or testing of the apparatus and processes described herein. For example, this can be accomplished through the use of general programming languages (e.g., C, C++), GDSII databases, hardware description languages (HDL) including Verilog HDL, VHDL, AHDL (Altera HDL) and so on, or other available programs, databases, nanoprocessing, and/or circuit (i.e., schematic) capture tools. Such software can be disposed in any known computer usable medium including semiconductor, magnetic disk, optical disc (e.g., CD-ROM, DVD-ROM, and the like) and as a computer data signal embodied in a computer usable (e.g., readable) transmission medium (e.g., carrier wave or any other medium including digital, optical, or analog-based medium). As such, the software can be transmitted over communication networks including the Internet and intranets. A system, method, computer program product, and propagated signal embodied in software may be included in a semiconductor intellectual property core (e.g., embodied in HDL) and transformed to hardware in the production of integrated circuits. Additionally, a system, method, computer program product, and propagated signal as described herein may be embodied as a combination of hardware and software.

One of the preferred implementations of the present invention is as a routine in an operating system made up of programming steps or instructions resident in a memory of a computing system, during computer operations. Until required by the computer system, the program instructions may be stored in another readable medium, e.g. in a disk drive, or in a removable memory, such as an optical disk for use in a CD or DVD computer input or in a floppy disk for use in a floppy disk drive computer input. Further, the program instructions may be stored in the memory of another computer prior to use in the system of the present invention and transmitted over a LAN or a WAN, such as the Internet, when required by the user of the present invention. One skilled in the art should appreciate that the processes controlling the present invention are capable of being distributed in the form of computer readable media in a variety of forms.

Any suitable programming language can be used to implement the routines of the present invention including C, C++, Java, assembly language, etc. Different programming techniques can be employed such as procedural or object oriented. The routines can execute on a single processing device or multiple processors. Although the steps, operations or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

This application is related to U.S. patent application No. 60/767,408, entitled "POS Receipt Bearing Real-Time Time/Geographic Advertisement", filed on Mar. 26, 2006, and U.S. patent application Ser. No. 11/690,912, entitled "POS Receipt Bearing Real-Time Time/Geographic Advertisement", filed on Mar. 26, 2007, the disclosures of which are expressly incorporated in their entireties by reference for all purposes.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

We claim as our invention the following:

1. An improved point-of-sale system for generating real-time content based on a real-time event and stored data, the system comprising:
  a commercial venue comprising a point-of sale ("POS") system, a query client, a receipt synthesizer, a POS printer, and a parser engine:
  a loyalty program site comprising a loyalty program server and a loyalty database;
  a content server system comprising a query server, a content server, a transaction server, a business logic engine, a contract server and a contract database;
  wherein the query client is configured to transmit the real-time content to the receipt synthesizer, the real-time content transmitted based on a content selection criteria and contract information; and
  wherein the receipt synthesizer is configured to generate a receipt with a nutritional information, the real-time content and purchase information for printing by the POS printer;
  wherein a real-time event by a customer of the venue triggers the POS system to send a print file for the transaction to the POS printer;
  wherein the parser engine is configured to intercept the print file during the transmission from the POS system to the POS printer, and parses the print file to retrieve a customer ID and purchase information;
  wherein the parser engine passes the purchase information to the receipt synthesizer;
  wherein the query client calls the loyalty program server with a Customer ID to obtain any customer information available;
  wherein the query client calls the query server with following information: location and POS information, purchase information, and customer information;
  wherein the transaction server is configured to request the contract server to determine a contract information for the venue from the contract database and transmit the contract information to the query server;
  wherein the query server is configured to obtain a content selection criteria from the business logic engine based on the location and POS information for the venue, and the purchase information and the customer information;
  wherein POS information, parameters and content are cached on the POS system to reduce the number of transactions between the POS system and the content server.

2. The system according to claim 1 wherein the parser engine is configured to transmit the purchase information to the receipt synthesizer, and the customer ID and the purchase information to the query client.

3. The system according to claim 2 wherein the query client is configured to transmit the customer ID with a query to the loyalty program server to retrieve additional customer information from the loyalty database.

4. The system according to claim 3 wherein the query client is configured to transmit to the query server a location and POS information for the venue, and the purchase information and the customer information.

5. The system according to claim 4 wherein the query server is configured to request authorization from the transaction server based on the location and POS information for the venue, and the purchase information and the customer information.

6. The system according to claim 1 wherein the query server is configured to transmit the advertising content to the query client.

7. A method for generating real-time content based on a real-time event and stored data for a point-of-sale system, the method comprising:
  generating, by a processor, real-time event information at a point-of-sale (POS) terminal of a commercial venue, real-time event information including customer information and purchase information;
  generating, by the processor, nutritional information based on the purchase information at a receipt synthesizer of the venue;
  sending, by the processor, the customer information, the purchase information, and venue information identifying a location of the POS terminal from a query client of the foodservice establishment to a query server of a real-time content server system;

intercepting at the parser engine the print file during the transmission from the POS system to the POS printer, and parsing the print file to retrieve a customer ID and purchase information;

passing the purchase information from the parser engine to the receipt synthesizer;

calling from the query client a loyalty program server with a Customer ID to obtain any customer information available;

calling from the query client the query server with following information: location and POS information, purchase information, and customer information;

requesting at the query server authorization from the transaction server based on the venue information, the purchase information and the customer information;

requesting at the transaction server that a contract server determine a contract information for the venue from a contract database and transmit the contract information to the query server;

obtaining at the query server a content selection criteria from a business logic engine based on the retail location information, the purchase information and the customer information;

obtaining at the query server a real-time content from the content server based on the content selection criteria and the contract information;

receiving the real-time content from the query server of the real-time content server system; and printing at a POS printer of the venue a receipt including the transaction information, the real-time content and the nutritional information;

wherein information, parameters and content are cached on the POS terminal to reduce the number of transactions between the POS terminal and the transaction server.

* * * * *